US012779488B2

(12) United States Patent
Mullady

(10) Patent No.: US 12,779,488 B2
(45) Date of Patent: Nov. 3, 2026

(54) SPRAYER NOZZLE SUPPORT

(71) Applicant: Maura Mullady, St Charles, MO (US)

(72) Inventor: Maura Mullady, St Charles, MO (US)

( * ) Notice: Subject to any disclaimer, the term of this patent is extended or adjusted under 35 U.S.C. 154(b) by 725 days.

(21) Appl. No.: 18/118,599

(22) Filed: Mar. 7, 2023

(65) Prior Publication Data

US 2024/0299967 A1 Sep. 12, 2024

(51) Int. Cl.
*B05B 15/625* (2018.01)
*B05B 1/16* (2006.01)
*B05B 15/652* (2018.01)

(52) U.S. Cl.
CPC .......... *B05B 15/625* (2018.02); *B05B 1/1645* (2013.01); *B05B 15/652* (2018.02)

(58) Field of Classification Search
CPC .... F02M 13/02; F02M 13/022; F02M 11/242; F02M 11/40
USPC .... 239/273, 280, 282, 394, 525, 587.1, 588; 248/75, 77, 83, 85, 163.1, 274.1, 299.1
See application file for complete search history.

(56) References Cited

U.S. PATENT DOCUMENTS 807,184 A * 12/1905 Malnberg .............. B05B 15/625 239/588
4,824,020 A * 4/1989 Harward ............... B05B 15/625 248/188
6,540,184 B2 * 4/2003 Thaxton .................. B60R 11/06 248/316.4
7,182,275 B1 * 2/2007 Wang .................... B05B 15/625 239/280
D760,349 S 6/2016 Chen
9,849,472 B2 12/2017 Ayers
9,861,992 B1 1/2018 Chen
10,610,879 B2 4/2020 Duong
D922,525 S 6/2021 Urry
2011/0042536 A1 * 2/2011 Phillips ................ F16M 13/022 248/299.1
2015/0343467 A1 12/2015 Chen
2018/0272369 A1 * 9/2018 Duong .................... B05B 15/68
2019/0200598 A1 7/2019 Chen
2020/0246825 A1 * 8/2020 Kessling ............... B05B 15/628
2020/0360743 A1 * 11/2020 Bakhos ................. B05B 15/652
2021/0291978 A1 * 9/2021 Suzuki .................... B64C 25/08

FOREIGN PATENT DOCUMENTS

CA 3013245 9/2016

* cited by examiner

*Primary Examiner* — Steven J Ganey

(57) ABSTRACT

A sprayer nozzle support apparatus for positioning the hose nozzle on a support structure or support surface to direct fluid in a selected direction includes a body that is hollow and is open at a supply inlet thereof. The body has a spray outlet extends into the body and is in fluid communication with the supply inlet. The supply inlet is fluidly attachable to an outlet end of a fluid supply hose. A plurality of support arms is coupled to and extends away from the body. Each support arm is elongated and is bendable into a selected shape in which each support arm retains the selected shape. A nozzle is fluidly coupled to the spray outlet of the body.

6 Claims, 7 Drawing Sheets

(In Use View)

SPRAYER NOZZLE SUPPORT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hose nozzles and more particularly pertains to a new hose nozzle for positioning the hose nozzle on a support structure or support surface to direct fluid in a selected direction.

(2) Description of Related Art Including Information Disclosed Under 37 CFR 1.97 and 1.98

The prior art includes several examples of hose nozzles which are operable to adjust the shape of fluid flow of fluid urged through and out of the hose nozzle. However, the prior art does not include a hose nozzle with support arms which are bendable into a selected shape and which retain the selected shape unless a sufficient force is applied to alter the shape.

BRIEF SUMMARY OF THE INVENTION

An embodiment of the disclosure meets the needs presented above by generally comprising a body that is hollow and is open at a supply inlet thereof. The body has a spray outlet extends into the body and is in fluid communication with the supply inlet. The supply inlet is fluidly attachable to an outlet end of a fluid supply hose. A plurality of support arms is coupled to and extends away from the body. Each support arm is elongated and is bendable into a selected shape in which each support arm retains the selected shape. A nozzle is fluidly coupled to the spray outlet of the body.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
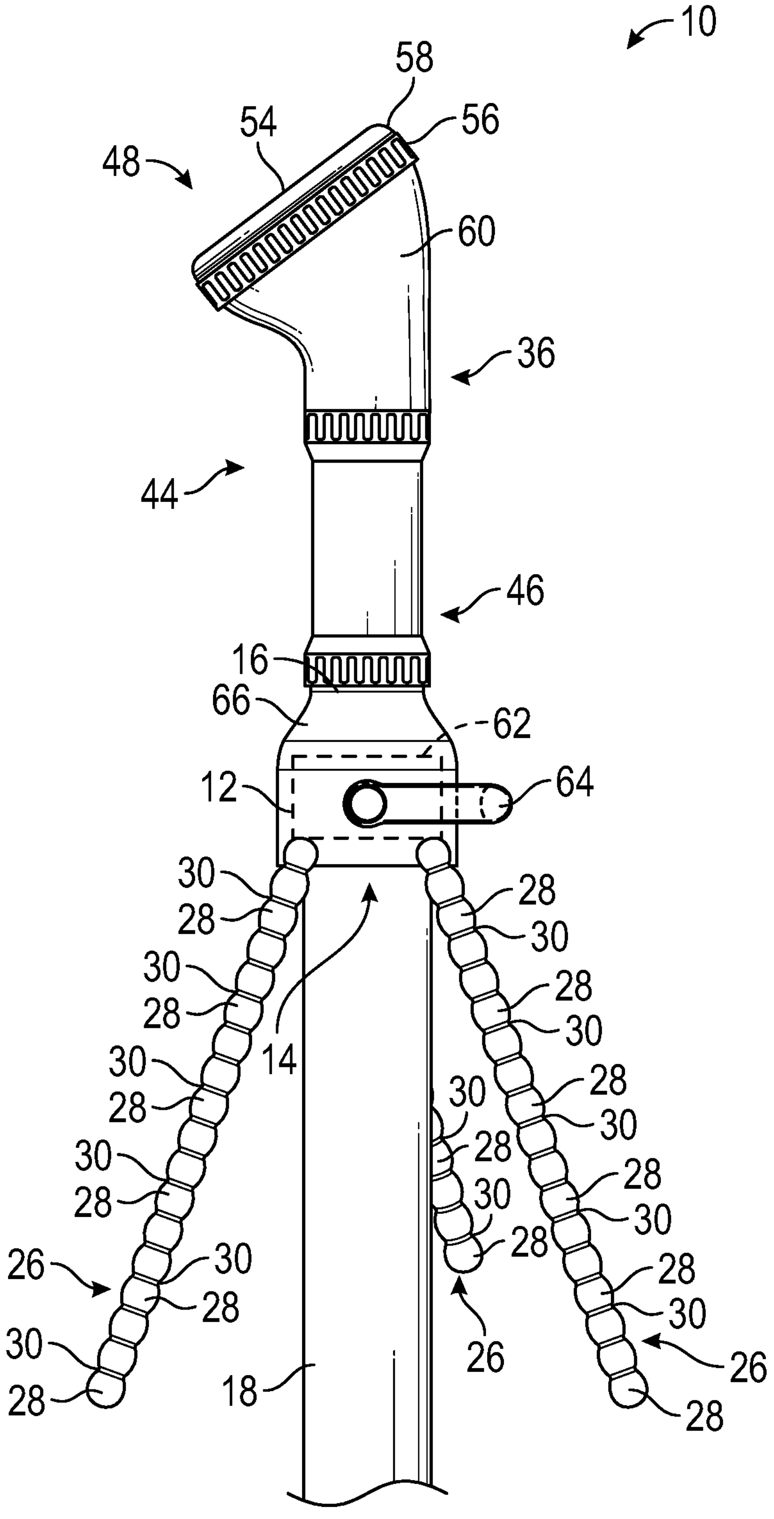
FIG. 1 is a side view of a sprayer nozzle support apparatus according to a first embodiment of the disclosure.
Figure 2:
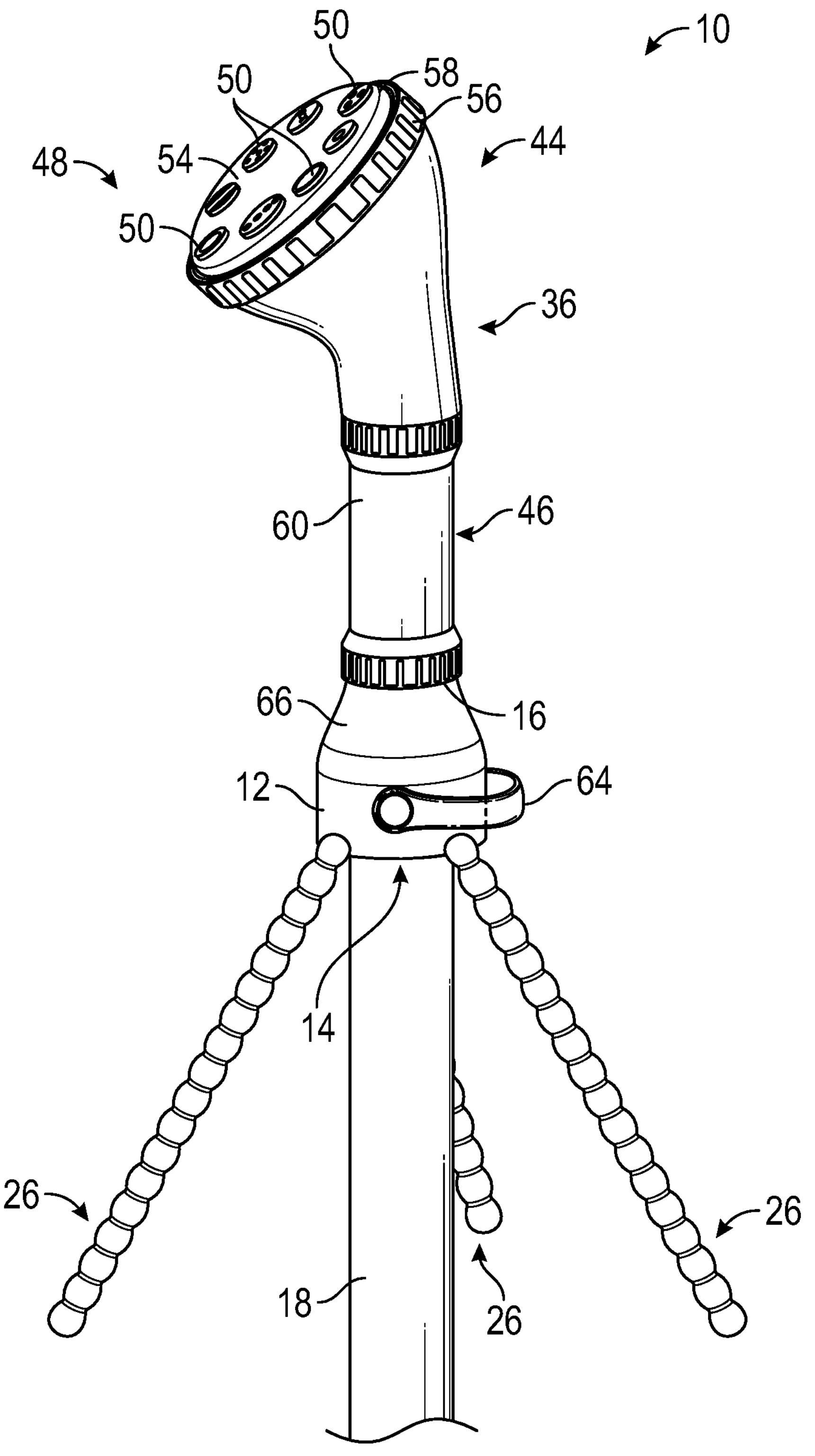
FIG. 2 is a top side perspective view of the first embodiment of the disclosure.
Figure 3:
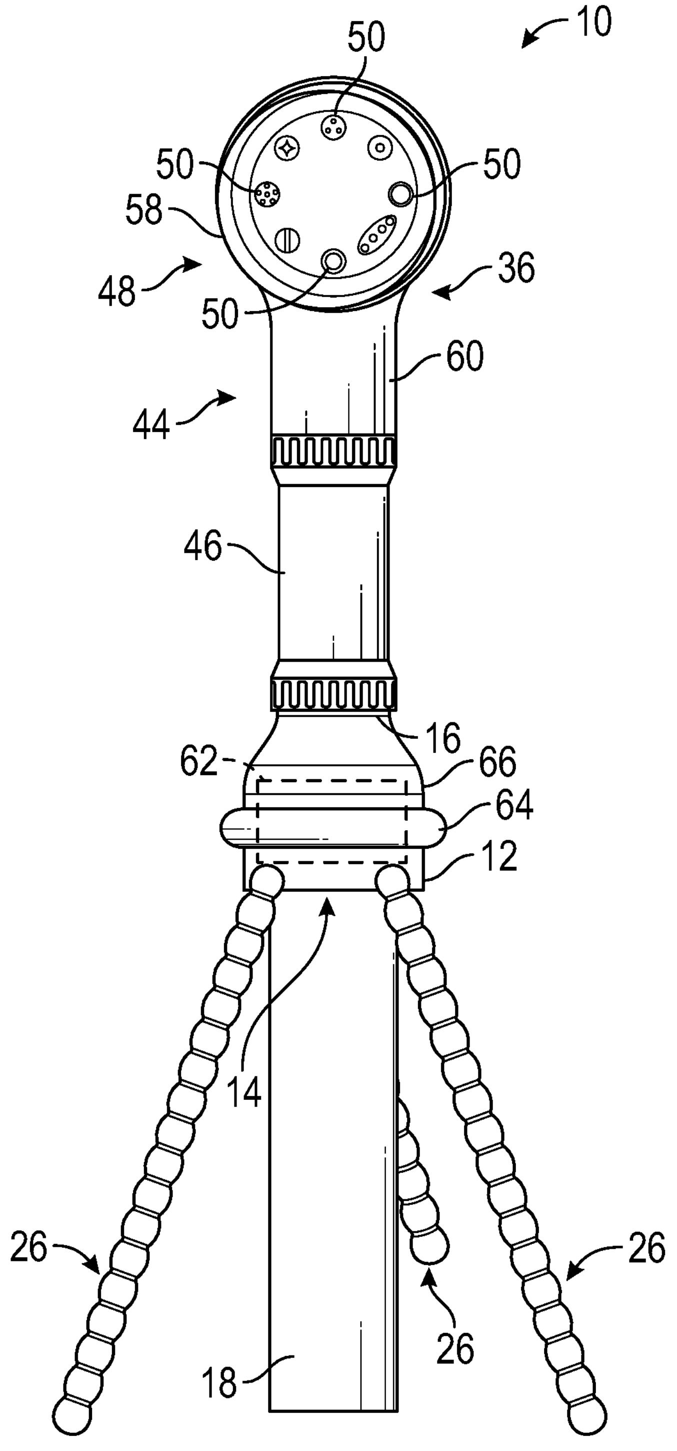
FIG. 3 is a front view of the first embodiment of the disclosure.
Figure 4:
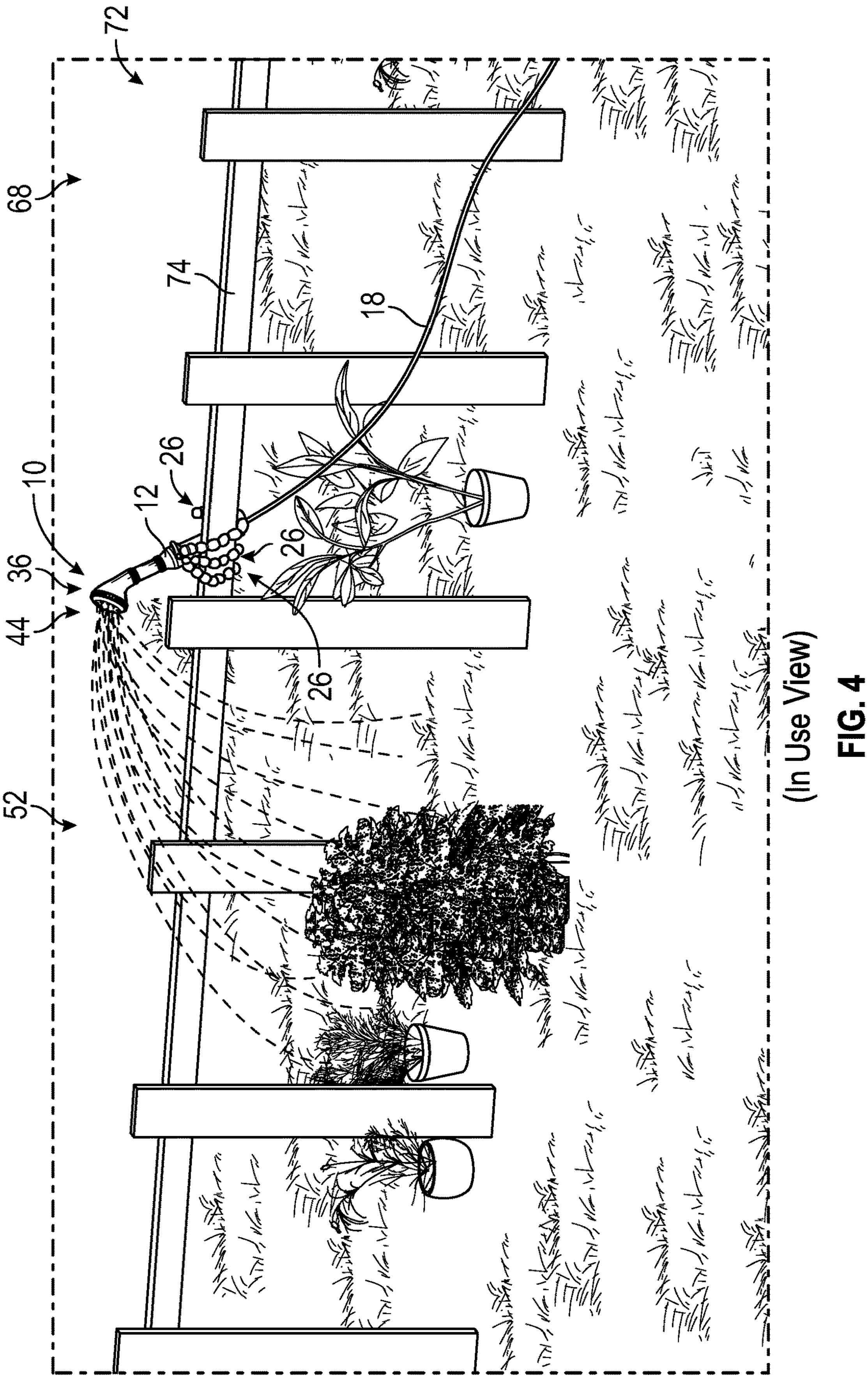
FIG. 4 is an in-use view of the first embodiment of the disclosure.
Figure 5:
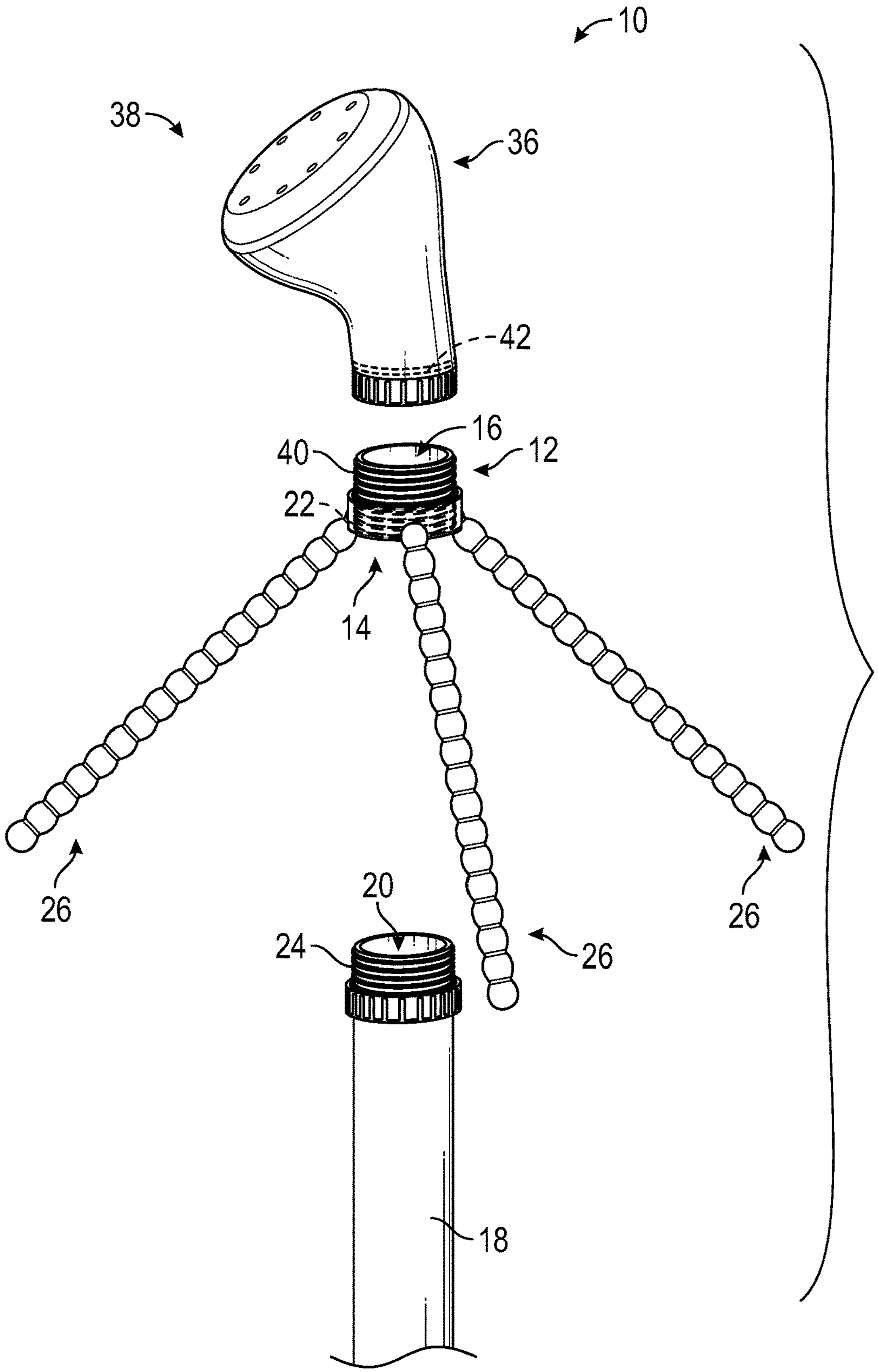
FIG. 5 is an exploded view of a second embodiment of the disclosure.
Figure 6:
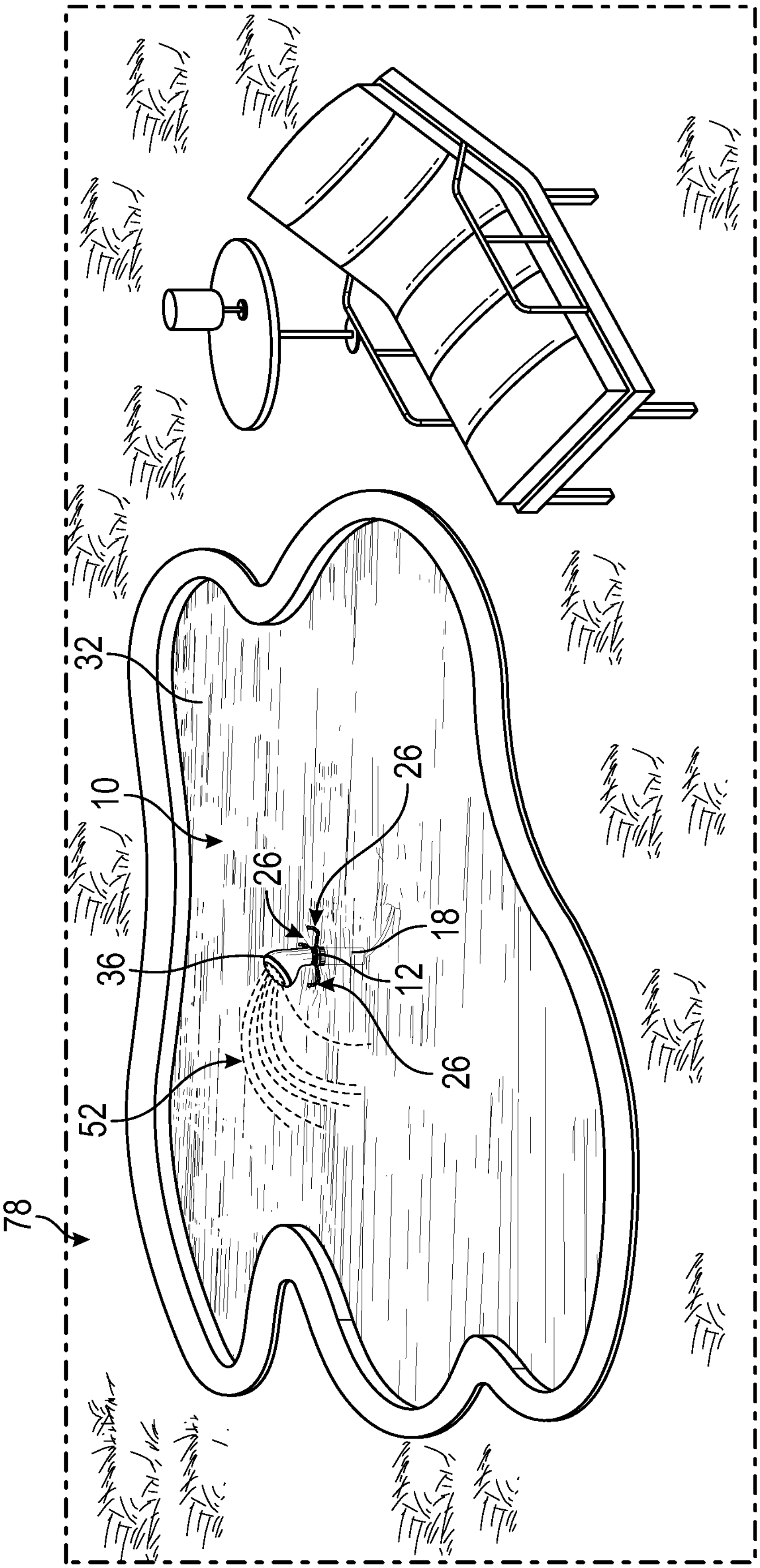
FIG. 6 is an in-use view of the second embodiment of the disclosure.
Figure 7:
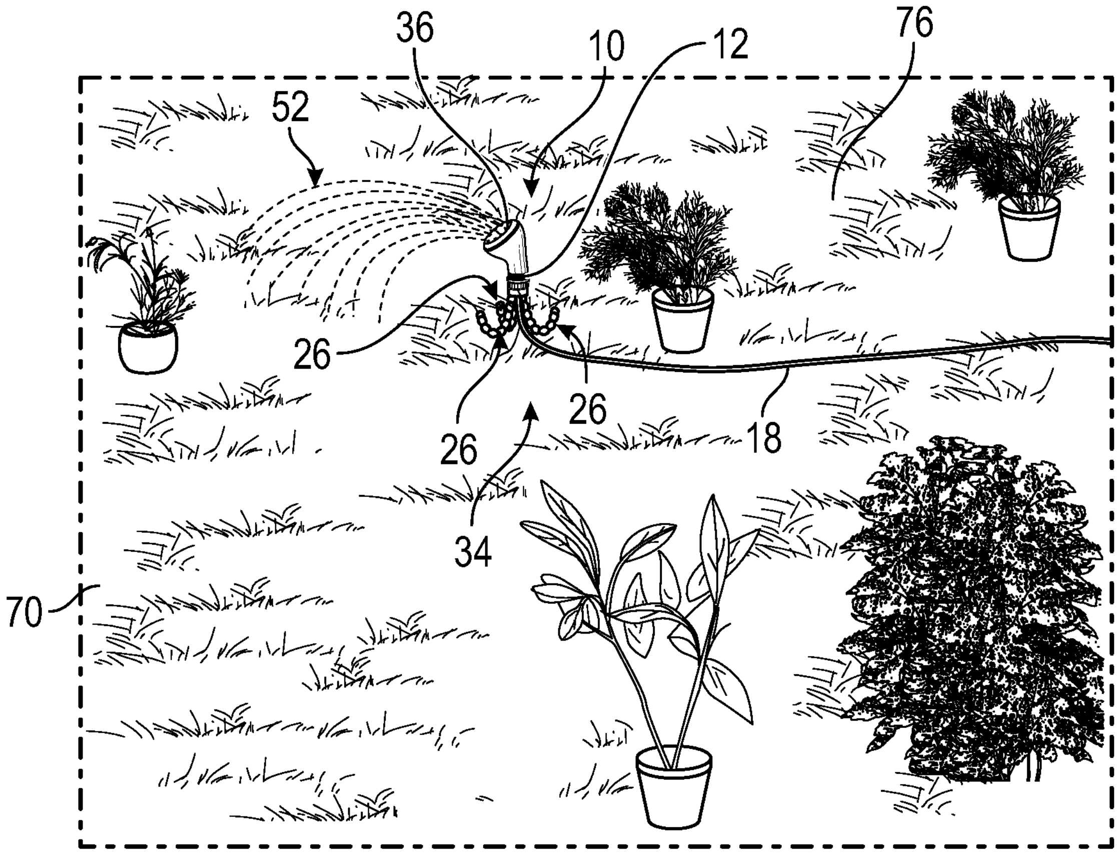
FIG. 7 is an in-use view of the second embodiment of the disclosure.

With reference now to the drawings, and in particular to FIGS. 1 through 7 thereof, a new hose nozzle embodying the principles and concepts of an embodiment of the disclosure and generally designated by the reference numeral 10 will be described.

As best illustrated in FIGS. 1 through 7, the sprayer nozzle support apparatus 10 generally comprises a body 12 which is hollow and is open at a supply inlet 14 thereof. The body 12 has a spray outlet 16 extending into the body 12 and is in fluid communication with the supply inlet 14. The supply inlet 14 is configured for fluidly attaching to an outlet end 20 of a fluid supply hose 18 and may have internal threads 22 which are complementary in shape to external threads 24 of the outlet end 20 of the fluid supply hose 18.

A plurality of support arms 26 is coupled to and extends away from the body 12. Each support arm 26 is elongated and is bendable into a selected shape wherein each support arm 26 retains the selected shape. Each support arm 26 comprises a plurality of links 28 which are serially interconnected by ball-and-socket joints 30 such that each link 28 is pivotal with respect to at least one adjacent link 28 of the plurality of links 28. Each link 28 is positionally fixed with respect to the at least one adjacent link 28 by frictional engagement, which is overcome with a sufficient force to bend the support arm 26 associated with the plurality of links 28 into the selected shape. Each support arm 26 of the plurality of support arms 26 is also buoyant in water 32. The plurality of support arms 26 is radially arranged around the body 12 and comprises three support arms 26 such that the body 12 and the plurality of support arms 26 define a tripod 34.

A nozzle 36 is fluidly coupled to the spray outlet 16 of the body 12. In a first embodiment 38, the nozzle 36 is removable from the body 12. The spray outlet 16 in this first embodiment 38 has exterior threads 40 which are complementary in shape to interior threads 42 of the nozzle 36. In a second embodiment 44, the nozzle 36 forms a unitary structure 46 with the body 12.

In the second embodiment 44, the nozzle 36 includes a spray pattern selector 48 having a plurality of spray ports 50. Each spray port 50 of the plurality of spray ports 50 is selectively positionable over the spray outlet 16 and is shaped to direct a flow path of a fluid 52 as the fluid 52 moves therethrough. The spray pattern selector 48 includes a disc 54 that is rotatably coupled to a housing 60 of the nozzle 36. The plurality of spray ports 50 is radially arranged on the disc 54. The spray pattern selector 48 has a grip 56 on a peripheral edge 58 of the disc 54.

The second embodiment 44 also includes a valve 62 and a lever 64. The valve 62 is in fluid communication with the body 12 and is movable between a closed position and an open position, where the valve 62 permits the fluid 52 to move through the body 12 when the valve 62 is open and inhibits the fluid 52 from moving through the body 12 when the valve 62 is closed. The lever 64 is operatively coupled to the valve 62 and extends away from the valve 62 through an outer wall 66 of the housing 60 of the nozzle 36. The lever 64 is pivotable with respect to the nozzle 36 to move the valve 62 between the closed position and the open position.

In use, the support arms 26 are bent into the selected position to mount the nozzle 36 to a support structure 68 or position the nozzle 36 on a support surface 70. For example, the support arms 26 may be bent around a beam 74 of a fence 72 to direct the nozzle 36 to spray the fluid 52 in a selected direction, such as to water a plant or a chosen area of a lawn. The support arms 26 may also be positioned to engage a ground surface 76 to position the nozzle 36 above the ground surface 76 and orient the nozzle 36 to spray the fluid in another selected direction. The nozzle 36 may also be placed in a pool 78 such that the support arms 26 float on water 32 held by the pool 78 and orient the nozzle 36 to spray the fluid 52 above the pool 78. The nozzle 36 may be placed in these and other arrangements for recreational use in which children, pets, or others interact with the fluid 52 sprayed by the nozzle 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sprayer nozzle support apparatus comprising:

a body being hollow and being open at a supply inlet thereof, the body having a spray outlet extending into the body and being in fluid communication with the supply inlet, the supply inlet being configured for fluidly attaching to an outlet end of a fluid supply hose;

a plurality of support arms being coupled to and extending away from the body, each support arm of the plurality of support arms being elongated, each support arm being bendable into a selected shape wherein each support arm retains the selected shape;

a nozzle being fluidly coupled to the spray outlet of the body;

wherein the nozzle forms a unitary structure with the body;

wherein the nozzle includes a spray pattern selector including a plurality of spray ports, each spray port of the plurality of spray ports being selectively positionable over the spray outlet and being shaped to direct a flow path of the fluid as the fluid moves therethrough, wherein the spray pattern selector includes a disc rotatably coupled to a housing of the nozzle, the plurality of spray ports being radially arranged on the disc, wherein the spray pattern selector has a grip on a peripheral edge of the disc;

a valve being in fluid communication with the body, the valve being movable between a closed position and an open position, the valve permitting fluid to move through the body when the valve is open, the valve inhibiting the fluid from moving through the body when the valve is closed; and a lever being operatively coupled to the valve, the lever extending away from the valve through an outer wall of the housing of the nozzle, the lever being pivotable with respect to the nozzle to move the valve between the closed position and the open position.

2. The apparatus of claim 1, wherein each arm of the plurality of support arms is buoyant in water.

3. The apparatus of claim 1, wherein the supply inlet has internal threads being configured to be complementary in shape to external threads of the outlet end of the fluid supply hose.

4. The apparatus of claim 1, wherein the plurality of support arms is radially arranged around the body.

5. The apparatus of claim 1, wherein the plurality of support arms comprises three support arms such that the body and the plurality of support arms define a tripod.

6. A sprayer nozzle support apparatus comprising:

a body being hollow and being open at a supply inlet thereof, the body having a spray outlet extending into the body and being in fluid communication with the supply inlet, the supply inlet being configured for fluidly attaching to an outlet end of a fluid supply hose, the supply inlet having internal threads being configured to be complementary in shape to external threads of the outlet end of the fluid supply hose;

a plurality of support arms being coupled to and extending away from the body, each support arm of the plurality of support arms being elongated, each support arm being bendable into a selected shape wherein each support arm retains the selected shape, each arm of the plurality of support arms being buoyant in water, the plurality of support arms being radially arranged around the body, the plurality of support arms comprising three support arms such that the body and the plurality of support arms define a tripod;

a nozzle being fluidly coupled to the spray outlet of the body, wherein the nozzle forms a unitary structure with the body, the nozzle including a spray pattern selector including a plurality of spray ports, each spray port of the plurality of spray ports being selectively positionable over the spray outlet and being shaped to direct a flow path of the fluid as the fluid moves therethrough, the spray pattern selector including a disc rotatably coupled to a housing of the nozzle, the plurality of spray ports being radially arranged on the disc, the spray pattern selector having a grip on a peripheral edge of the disc, the sprayer nozzle apparatus further comprising:

a valve being in fluid communication with the body, the valve being movable between a closed position and an open position, the valve permitting fluid to move through the body when the valve is open, the valve inhibiting the fluid from moving through the body when the valve is closed; and a lever being operatively coupled to the valve, the lever extending away from the valve through an outer wall of the housing of the nozzle, the lever being pivotable with respect to the nozzle to move the valve between the closed position and the open position.

* * * * *